(12) United States Patent
Lee et al.

(10) Patent No.: US 10,198,851 B2
(45) Date of Patent: Feb. 5, 2019

(54) RENDERING SYSTEM AND METHOD

(71) Applicant: Samsung Electronics Co., Ltd., Suwon-si (KR)

(72) Inventors: Wonjong Lee, Seoul (KR); Hoiju Chung, Yongin-si (KR); Youngsam Shin, Anyang-si (KR); Sangoak Woo, Hwaseong-si (KR); Seokjoong Hwang, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 127 days.

(21) Appl. No.: 15/247,023

(22) Filed: Aug. 25, 2016

(65) Prior Publication Data

US 2017/0061674 A1 Mar. 2, 2017

(30) Foreign Application Priority Data

Aug. 31, 2015 (KR) .................. 10-2015-0123189

(51) Int. Cl.
*G06T 15/06* (2011.01)
*G06T 15/80* (2011.01)
*G06T 15/00* (2011.01)

(52) U.S. Cl.
CPC ............ *G06T 15/06* (2013.01); *G06T 15/005* (2013.01); *G06T 15/80* (2013.01); *G06T 2200/28* (2013.01)

(58) Field of Classification Search
CPC ....... G06T 15/06; G06T 15/005; G06T 15/80; G06T 2200/28
See application file for complete search history.

(56) References Cited

U.S. PATENT DOCUMENTS

| 7,546,425 | B2 | 6/2009 | Mori et al. | |
|---|---|---|---|---|
| 9,030,476 | B2 | 5/2015 | Peterson et al. | |
| 9,035,946 | B1* | 5/2015 | Zimmerman | G06T 1/60 |
| | | | | 345/426 |
| 2008/0074420 | A1* | 3/2008 | Kuesel | G06T 15/06 |
| | | | | 345/426 |

(Continued)

FOREIGN PATENT DOCUMENTS

| KR | 10-2015-0020012 A | 2/2015 |
|---|---|---|
| KR | 10-2015-0057868 A | 5/2015 |

OTHER PUBLICATIONS

Thales Sabino et al., "A Hybrid GPU Rasterized and Ray Traced Rendering Pipeline for Real Time Rendering of Per Pixel Effects", M. Herrlich, R. Malaka, and M. Masuch (Eds.): ICEC 2012, LNCS 7522, pp. 292-305, IFIP International Federation for Information Processing (Year: 2012).*

(Continued)

*Primary Examiner* — William A Beutel
(74) *Attorney, Agent, or Firm* — F. Chau & Associates, LLC

(57) ABSTRACT

A rendering system includes: a ray generator configured to generate a ray; a memory chip configured to store information about objects in three-dimensional (3D) space; an intersection tester embedded in the memory chip and configured to perform an intersection test between the ray and the objects by using the information about the objects and information about the ray; and a shader configured to perform pixel shading based on a result of the intersection test.

24 Claims, 9 Drawing Sheets

(56) References Cited

U.S. PATENT DOCUMENTS

| | | | |
|---|---|---|---|
| 2009/0262132 A1* | 10/2009 | Peterson | ............... G06T 15/005 |
| | | | 345/619 |
| 2011/0093662 A1 | 4/2011 | Walker et al. | |
| 2012/0001912 A1 | 1/2012 | Peterson et al. | |
| 2012/0069023 A1 | 3/2012 | Hur et al. | |
| 2015/0042656 A1 | 2/2015 | Roh | |
| 2015/0074314 A1* | 3/2015 | Terada | ................ G06F 13/1678 |
| | | | 710/307 |
| 2015/0138202 A1 | 5/2015 | Lee et al. | |

OTHER PUBLICATIONS

Jeff Draper, et al., "The Architecture of the DIVA Processing-in-Memory Chip", ICS '02 Proceedings of the 16th international conference on Supercomputing, pp. 14-25, New York, New York, USA—Jun. 22-26, 2002) (Year: 2002).*

M. F. Deering, et al., "FBRAM: A new Form of Memory Optimized for 3D Graphics," *Proceedings from the 21$^{st}$ Annual Conference Computer Graphics and Interactive Techniques*, SIGGRAPH '94, Jul. 24-29, 2004, Orlando, Florida (8 pages, in English).

* cited by examiner

RENDERING SYSTEM AND METHOD

CROSS-REFERENCE TO RELATED APPLICATION(S)

This application claims the benefit under 35 USC 119(a) of Korean Patent Application No. 10-2015-0123189, filed on Aug. 31, 2015, in the Korean Intellectual Property Office, the entire disclosure of which is incorporated herein by reference for all purposes.

BACKGROUND

1. Field

The following description relates to rendering systems and methods of rendering for performing an intersection test in a memory chip.

2. Description of Related Art

In general, three-dimensional (3D) rendering refers to image processing in which data of a 3D object is synthesized into images to be seen from a view point of a camera.

An example of a rendering method is a rendering method using a rasterization method, in which an image is generated while projecting a 3D object onto a screen. Another example of a rendering method is one using a ray tracing method, in which an image is generated by tracing a path of incident light along a ray proceeding towards each pixel of an image from a view point of a camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a rendering system includes: a ray generator configured to generate a ray; a memory chip configured to store information about objects in three-dimensional (3D) space; an intersection tester embedded in the memory chip and configured to perform an intersection test between the ray and the objects by using the information about the objects and information about the ray; and a shader configured to perform pixel shading based on a result of the intersection test.

The intersection tester may be configured to perform the intersection test in the memory chip.

The rendering system may further include a memory configured to store the information about the objects, wherein the memory and the intersection test unit are integrated in the memory chip.

The intersection tester may be configured to receive information about the ray via a system bus. The intersection tester may be configured to receive the information about the objects via an internal bus embedded in the memory chip. The shader may be configured to receive a result of the intersection test via the system bus.

The internal bus may include a memory bandwidth that is broader than a memory bandwidth of the system bus.

The intersection tester may include: a traversal (TRV) unit configured to traverse an acceleration structure which is included in the information about the objects to perform an intersection test between the ray and a node; and an intersection (IST) unit configured to calculate a hit point of the ray intersecting with a primitive based on a result of the intersection test between the ray and the node and by using geometric data included in the information about the objects, wherein the shading unit is configured to determine a pixel value based on the hit point.

The ray generator and the shader may be embedded in the memory chip.

The intersection unit may be configured to receive the information about the ray and the information about the objects via an internal bus embedded in the memory chip. The shader may be configured to receive a result of the intersection test via the internal bus.

The rendering system may further include a ray tracing apparatus configured to generate a primary ray, perform an intersection test between the primary ray and the objects, and determine a first pixel value based on a result of the intersection test between the primary ray and the objects, wherein the ray generator is configured to generate a secondary ray based on the result of the intersection test between the primary ray and the objects, wherein the intersection tester is configured to perform an intersection test between the secondary ray and the objects, and wherein the shader is configured to determine a second pixel value based on a result of the intersection test between the secondary ray and the objects.

The rendering system may further include a synthesizer configured to merge the first pixel value and the second pixel value to determine a final pixel value.

According to another general aspect, a rendering system includes: a memory chip configured to store information about objects in three-dimensional (3D) space; a graphics processing unit (GPU) configured to determine a first pixel value of a pixel by performing rendering via rasterization on the objects, and generate a ray; and an intersection tester embedded in the memory chip and configured to perform an intersection test between the ray and the objects by using information about the ray and information about the objects, wherein the GPU is configured to determine a second pixel value of the pixel based on a result of the intersection test and merge the first pixel value and the second pixel value to determine a final pixel value.

The intersection tester may be configured to perform the intersection test in the memory chip.

The intersection tester may be configured to receive the information about the ray via a system bus. The intersection tester may be configured to receive the information about the objects via an exclusive internal bus embedded in the memory chip. The GPU may be configured to receive a result of the intersection test via the system bus.

The GPU may include: a rasterizer configured to split primitives of the objects into fragments; a shader configured to perform shading on the fragments to determine the first pixel value and to determine the second pixel value based on a result of the intersection test; and a raster operator (ROP) configured to merge the first pixel value and the second pixel value to determine the final pixel value.

The shader may be configured to calculate a hit point between a primary ray and the objects, and generate the ray based on the hit point as a secondary ray.

According to another general aspect, a rendering method includes: generating a ray; performing, in a memory chip, an intersection test between the ray and objects in three-dimensional (3D) space by using information about the ray and information about the 3D spatial objects stored in the memory chip; and performing pixel shading based on a result of the intersection test.

The performing of the intersection test may include reading the information about the objects via an exclusive internal bus embedded in the memory chip.

The generating of the ray may include generating the ray in the memory chip. The performing of the pixel shading may include performing the pixel shading in the memory chip.

The rendering method may further include generating a primary ray, performing an intersection test between the primary ray and the objects, and determining a first pixel value based on a result of the intersection test between the primary ray and the objects, wherein the generating of the ray includes generating a secondary ray based on the result of the intersection test between the primary ray and the objects, wherein the performing of the intersection test includes performing an intersection test between the secondary ray and the objects, and wherein the performing of the pixel shading includes determining a second pixel value based on a result of the intersection test between the secondary ray and the objects.

The rendering method may further include merging the first pixel value and the second pixel value to determine a final pixel value.

According to another general aspect, a memory chip includes: a memory configured to store information about objects in three-dimensional (3D) space; and an intersection tester configured to receive information about a ray, perform an intersection test between the ray and the objects by using the information about the objects and the information about the ray, and provide results of the intersection test to a shader for performing pixel shading.

The memory chip may further include an internal bus embedded in the memory chip, wherein the intersection tester is configured to receive the information about the objects from the memory via the internal bus.

The intersection tester may be configured to: traverse an acceleration structure which is included in the information about the objects to perform an intersection test between the ray and a node; and calculate, for the pixel shading, a hit point of the ray intersecting with a primitive based on a result of the intersection test between the ray and the node and by using geometric data included in the information about the objects.

The memory chip may further include the ray generator and the shader embedded in the memory chip.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

As used herein, the term "and/or" includes any and all combinations of one or more of the associated listed items. Expressions such as "at least one of," when preceding a list of elements, modify the entire list of elements and do not modify the individual elements of the list.

Terms such as "comprise" or "include" should not be construed as necessarily including various elements or processes described in the specification, and it should be construed that some of the elements or the processes may not be included, or additional elements or processes may be further included.

Terms including ordinal numbers such as 'first', 'second', etc. are used to describe various elements but the elements should not be defined by these terms. The terms are used only for distinguishing one element from another element or for convenience of description.

Figure 1:
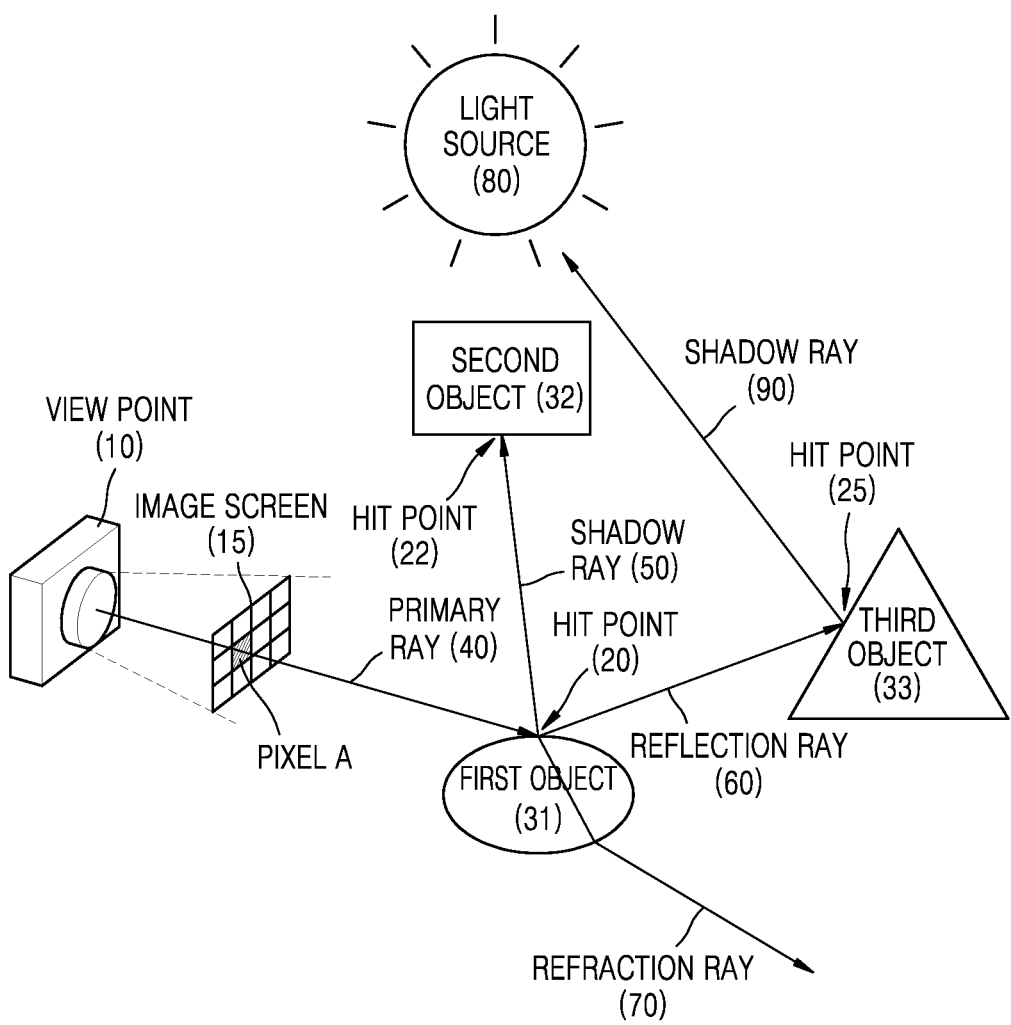
FIG. 1 is a view for describing an example of a ray tracing method.

FIG. 1 is a view for describing an example of a ray tracing method.

As illustrated in FIG. 1, three-dimensional (3D) modeling includes a light source 80, a first object 31, a second object 32, and a third object 33. In FIG. 1, although the first object 31, the second object 32, and the third object 33 are presented as two-dimensional objects for convenience of description, the first object 31, the second object 32, and the third object 33 are 3D objects. Also, the objects 31, 32 and 33 each include a set of primitives which are each a most basic unit region. For example, a primitive may be a polygon such as a triangle or a square. In other words, a primitive may be a most basic unit region in regard to rendering.

The first object 31 has a reflectivity and a refractive index that are both greater than 0, and the second object 32 and the third object 33 both have a reflectivity and a refractive index equal to 0. In other words, the first object 31 reflects and refracts light, and both the second object 32 and the third object 33 neither reflect nor refract light.

In the 3D modeling as illustrated in FIG. 1, a rendering system 100, 100a, 200, 300, or 400 (see FIGS. 2, 3, 5, 6 and 8) determines a view point 10 to generate a 3D image and determines an image screen 15 according to the determined view point 10. Once the view point 10 and the image screen 15 are determined, the rendering system 100, 100a, 200, 300, or 400 generates a ray with respect to each pixel on the image screen 15 from the view point 10. For example, as illustrated in FIG. 1, when the image screen 15 is comprised of 4×3 pixels, the rendering system 100, 100a, 200, 300, or 400 generates a ray with respect to each of twelve pixels.

A ray with respect to one pixel (pixel A) will be described below, with reference to FIG. 1.

Referring to FIG. 1, a primary ray 40 is generated with respect to pixel A from the view point 10. The primary ray 40 passes through a 3D space to reach the first object 31. The first object 31 includes a set of primitives. The following description will focus on an example in which a primitive is a triangle.

At a hit point 20 of the primary ray 40 on the first object 31, a shadow ray 50, a reflection ray 60, and a refraction ray 70 are generated. The shadow ray 50, the reflection ray 60, and the refraction ray 70 are referred to as secondary rays.

The shadow ray 50 is generated towards the light source 80 from the hit point 20. The reflection ray 60 is generated in a direction corresponding to an incident angle of the primary ray 40, while a weighted value is applied thereto according to a reflectivity of the first object 31. The refraction ray 70 is generated in a direction corresponding to the incident angle of the primary ray 40 and a refractive index of the first object 31, and a weighted value is applied the refraction ray 70 according to the refractive index of the first object 31.

The rendering system 100, 100a, 200, 300, or 400 determines whether the hit point 20 is exposed to the light source 80 by using the shadow ray 50. For example, as illustrated in FIG. 1, when the shadow ray 50 encounters the second object 32, a shadow is generated at the hit point 22. In addition, the rendering system 100, 100a, 200, 300, or 400 determines whether the refraction ray 70 and the reflection ray 60 reach other objects. For example, as illustrated in FIG. 1, no object exists in a moving direction of the refraction ray 70, while the reflection ray 60 reaches the third object 33. Accordingly, the rendering system 100, 100a, 200, 300, or 400 identifies coordinates and color information of the hit point on the third object 33, and generates another shadow ray 90 from the hit point 25 of the third object 33. At this time, the rendering system 100, 100a, 200, 300, or 400 determines whether the shadow ray 90 is exposed to the light source 80.

In some embodiments, when both a reflectivity and a refraction index of the third object 33 are 0, neither reflection ray nor refraction ray with respect to the third object 33 is generated.

As described above, the rendering system 100, 100a, 200, 300, or 400 analyzes the primary ray 40 with respect to the pixel A and all rays derived from the primary ray 40, and determines a color value of the pixel A based on obtained analysis results. The determining of the color value of the pixel A is influenced by a color of the primary ray 40 at the hit point, a color of the reflection ray 60 at the hit point, and whether the shadow ray 50 reaches the light source 80.

The rendering system 100, 100a, 200, 300, or 400 performs the above-mentioned process to all pixels of the image screen 15, thereby configuring the image screen 15.

Figure 2:
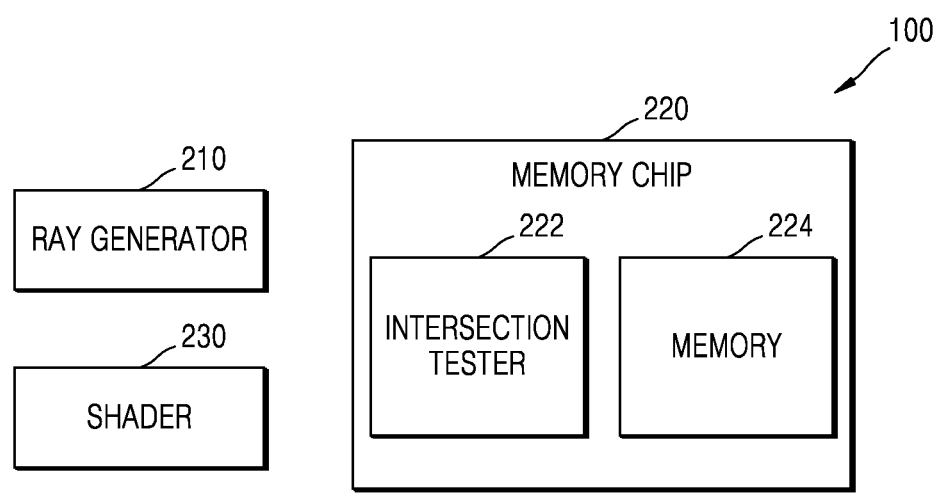
FIG. 2 illustrates a rendering system, according to an embodiment.

FIG. 2 illustrates the rendering system 100 according to an example.

The rendering system 100 includes a ray generator 210, a memory chip 220, and a shader 230. In FIG. 1, only elements of the rendering system 100 related to the described embodiment are illustrated. However, it will be understood by one of ordinary skill in the art that general-purpose elements other than the elements illustrated in FIG. 1 may also be included.

The ray generator 210 generates a ray for ray tracing. The ray includes a primary ray generated from a view point and rays derived from the primary ray. For example, as described with reference to FIG. 1, the ray generator 210 generates a primary ray from the view point 10, and generates a secondary ray at a hit point between the primary ray and an object. The secondary ray may be a reflection ray, refraction ray, or shadow ray generated at the hit point between the primary ray and the object.

In addition, the ray generator 210 may generate a third ray at a hit point of the secondary ray on another object. The ray generating unit 210 may continuously generate a ray until a ray does not intersect with an object or may generate a ray within a predetermined number of times.

In addition, according to an embodiment, the ray generator 210 receives a rendering command from a host (not shown), and generates a ray for ray tracing according to the rendering command.

The memory chip 220 stores information about 3D spatial objects. The information about 3D spatial objects includes an acceleration structure including position information of the objects and geometric data including information about a vertices and positions of primitives included in the objects. In addition, the memory chip 220 may include a random access memory (RAM) such as a dynamic random access memory (DRAM) or a static random access memory (SRAM), a read-only memory (ROM), an electrically erasable programmable read-only memory (EEPROM), a CD-ROM, a Blu-ray or other optical disk storage, a hard disk drive (HDD), a solid state drive (SSD) or a flash memory, and may further include other external storage devices which access the rendering system 100.

In addition, the memory chip 220 includes an intersection tester 222 and a memory 224. According to an embodiment, the intersection tester 222 and the memory module 224 are embedded the memory chip 220. That is, the intersection tester 222 and the memory 224 may be integrated in the memory chip 220. For example, the intersection tester 222 may be stacked in the memory chip 220. The memory 224 stores information about 3D spatial objects.

The intersection test unit 222 performs an intersection test between a ray generated by the ray generator 240 and objects by using information about the generated ray and information about the objects stored in the memory 224. That is, the intersection tester 222 performs an intersection test between a ray and objects in the memory chip 220. In detail, the intersection tester 222 performs a ray-node intersection test based on an acceleration structure included in the information about objects. That is, the intersection test unit 222 reads an acceleration structure stored in the memory 224 to perform a ray-node intersection test. In addition, the intersection tester 222 calculates a hit point between a ray and a primitive based on geometric data included in the information about the objects. That is, the intersection tester 222 reads geometric data stored in the memory 224 to calculate a hit point between a ray and a primitive. The reading of geometric data to calculate a hit point will be described in more detail with reference to FIG. 3 below. The intersection tester 222 calculates a hit point of a ray intersecting with a primitive included in an object as a result of an intersection test between the ray and the objects.

The shader 230 performs pixel shading based on a result of the intersection test between a ray and the objects. That is, the shader 230 determines a pixel value based on the information about a hit point between a ray and a primitive and characteristics of a material of the hit point. According to an embodiment, the pixel value includes a color value of a pixel. For example, in the case of the pixel A of FIG. 1, the shader 230 determines a color value of the pixel A by considering the effects due to the primary ray 40 and the secondary rays, which include the refraction ray 70, the reflection ray 60, and the shadow ray 50. The memory chip 220 stores a pixel value determined by using the shader 230.

Figure 3:
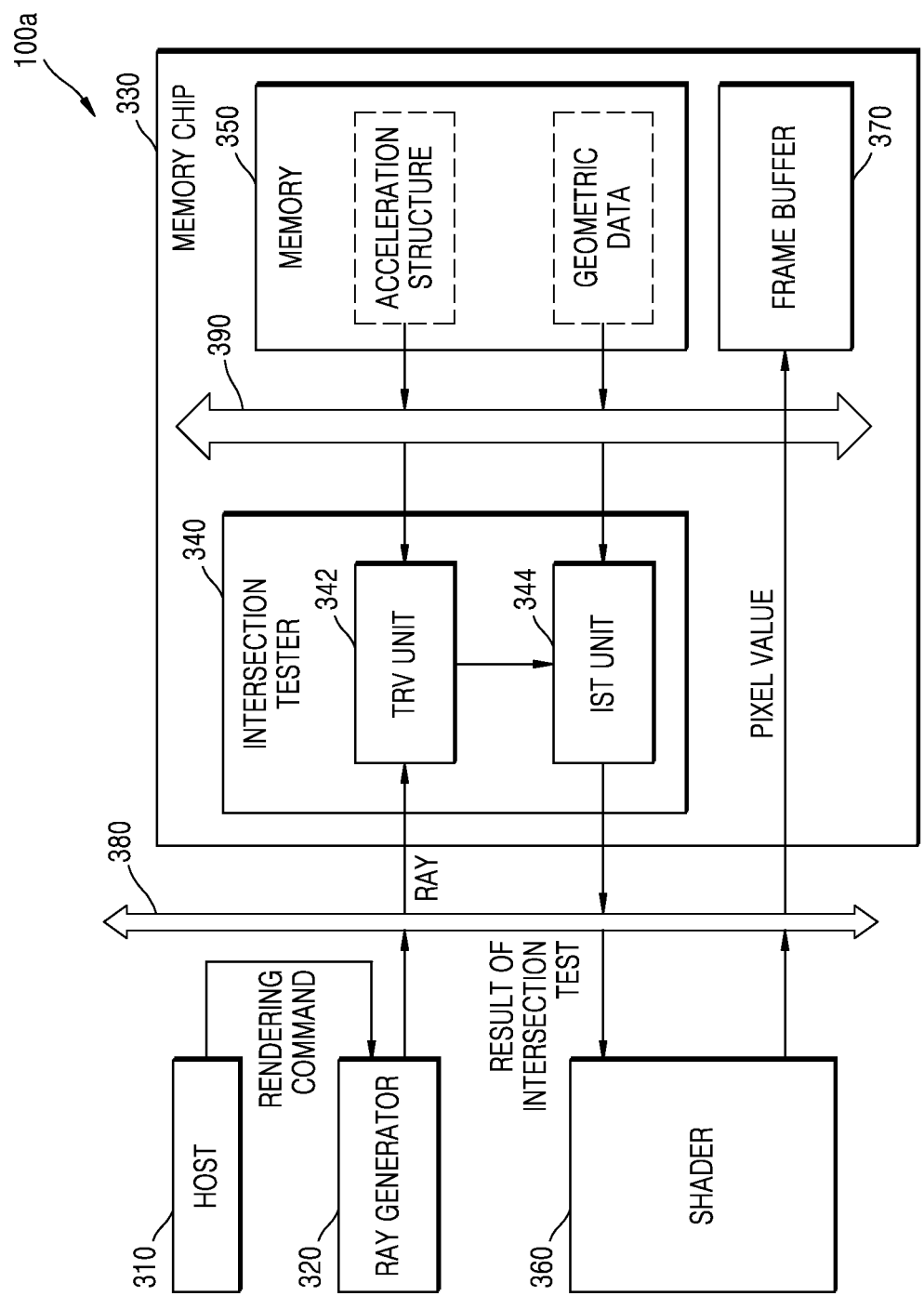
FIG. 3 illustrates a rendering system, according to another embodiment.

FIG. 3 illustrates the rendering system 100a according to an example.

The rendering system 100a includes a host 310, a ray generator 320, a memory chip 330, a shader 360, and a system bus 380. In FIG. 3, only elements of the rendering system 100a related to the described embodiment are illustrated. However, one of ordinary skill in the art will understand that general-purpose elements other than the elements illustrated in FIG. 3 may also be included.

The ray generator 320, the memory chip 330, and the shader 360 of FIG. 3 respectively correspond to the ray generator 210, the memory chip 220, and the shader 230 of FIG. 2, and thus a repeated description of these elements will be omitted.

The host 310 transmits a rendering command to the ray generator 320 via the system bus 380. The host 310 may be a central processing unit (CPU), for example.

The system bus 380 is a hardware connecting other hardwares in the rendering system 100a such that data is transmitted or received between the hardwares. The system bus 380 may include various types of buses such as a peripheral component interconnect (PCI) bus, a PCI Express bus or the like.

The ray generator 320 receives a rendering command via the system bus 380, and generates a ray for ray tracing according to the rendering command. Also, the ray generator 320 transmits information about the generated ray to the memory chip 330 via the system bus 380.

The memory chip 330 includes an intersection tester 340, a memory 350, an exclusive internal bus 390, and a frame buffer 370. The exclusive internal bus 390 may be located only in the memory chip 330, and may be configured to carry only communications between the components in the memory chip 330.

The intersection tester 340 includes a Traversal unit (TRV) unit 342 and an Intersection (IST) unit 344.

The TRV unit 342 receives information about the generated ray from the ray generator 320 via the system bus 380. Information about a ray includes information about a view point and a direction of the ray. In addition, information about a secondary ray includes information about a start point and a direction of the secondary ray. The start point of the secondary ray refers to a point where a primary ray intersects with an object. Also, a view point or a start point are represented by coordinates, and a direction is represented by a vector.

The TRV unit 342 receives an acceleration structure included in information about objects stored in the memory module 350 via the exclusive internal bus 390. That is, the TRV unit 342 reads an acceleration structure via the exclusive internal bus 390. The exclusive internal bus 390 is a bus embedded in the memory chip 330 and connects hardware components in the memory chip 330. Also, the exclusive internal bus 390 may have a broader memory bandwidth than the system bus 380. Thus, since the TRV unit 342 is embedded in the memory chip 330, the TRV unit 342 receives an acceleration structure more quickly than the TRV unit 342 would if it were located outside the memory chip 330 and received an acceleration structure via the system bus 380. In other words, the TRV unit 342 reads an acceleration structure faster by using the exclusive internal bus 390 than by using the system bus 380.

The TRV unit 342 traverses an acceleration structure based on information about rays. The acceleration structure may be generated by using an acceleration structure generating apparatus (not shown), and indicates a structure including position information of 3D spatial objects. In detail, the acceleration structure generating apparatus may split 3D space into a hierarchical tree form and use a K-Dimensional tree (KD-tree) or a Bounding Volume Hierarchy (BVH) to thereby generate an acceleration structure indicating a relationship between spatial objects.

Figure 4:
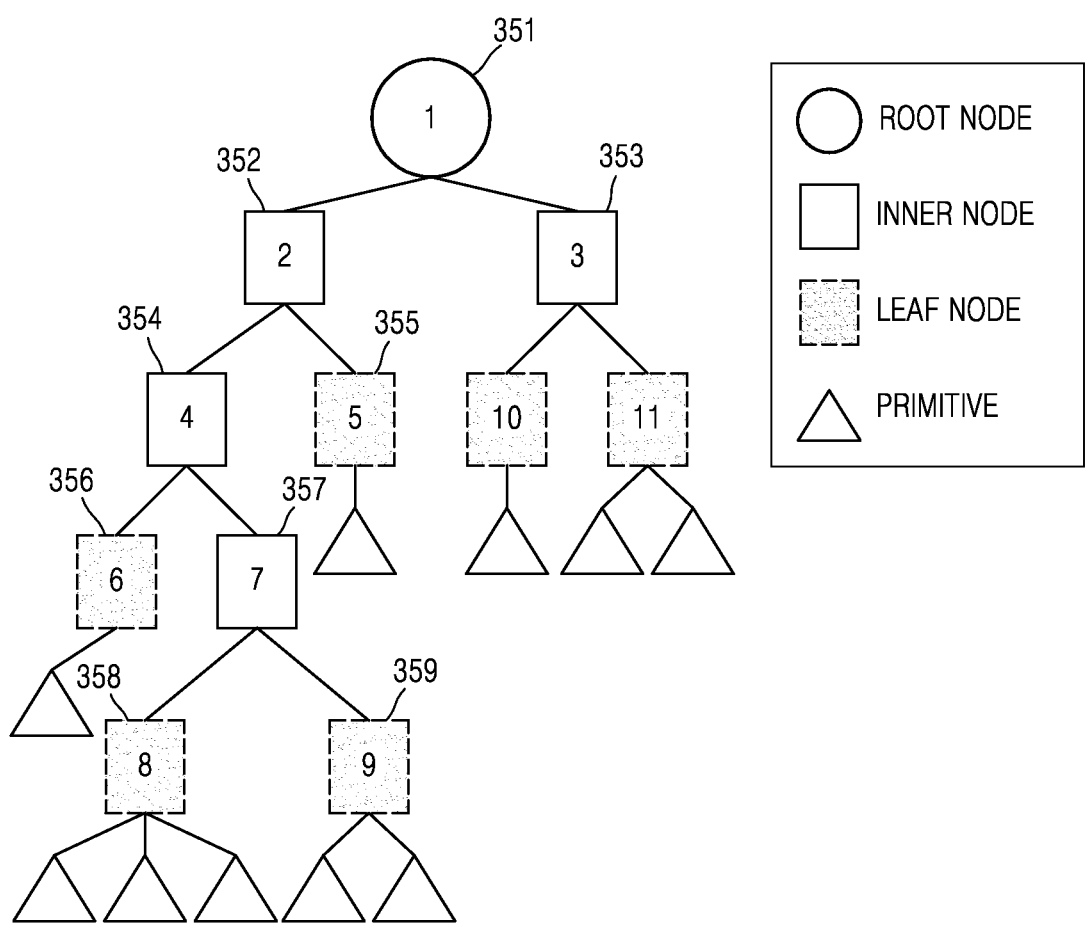
FIG. 4 is a view for describing an acceleration structure, according to an embodiment.

FIG. 4 is a view for describing an example of an acceleration structure.

With respect to FIG. 4, for convenience of description, each node of the acceleration structure is referred to by a number written on the respective node. For example, a node 351 with a number 1 written thereon and presented as a circle is referred to as a first node 351, a node 352 with a number 2 written thereon and presented as a square is referred to as a second node 352, and a node 355 with a number 5 written thereon and presented as a dotted square is referred to as a fifth node 355.

Referring to FIG. 4, the acceleration structure includes a top node, an inner node, a leaf node, and a primitive. The top node is an uppermost node which does not have a parent node but has only a child node. The inner node is a node which has both a parent node and a child node. The leaf node is a lowermost node which does not have a child node but has only a parent node.

In FIG. 4, the first node 351 indicates the top node. For example, child nodes of the first node 351 are the second node 352 and the third node 353, and a parent node of the first node 351 does not exist. In addition, the second node 352 is an inner node. For example, the first node 351 is a parent node of the second node 351, and the fourth node 354 and the fifth node 355 are child nodes of the second node 352. In addition, an eighth node 358 is a leaf node. For example, the seventh node 357 is a parent node of the eighth node 358, and a child node of the eighth node 358 does not exist.

In an embodiment, a leaf node includes primitives which exist therein. For example, as illustrated in FIG. 4, a sixth node 356, which is a leaf node, includes one primitive, the eighth node 358 includes three primitives, and a ninth node 359, which is a leaf node, includes two primitives.

The TRV unit 342 of FIG. 3 traverses the acceleration structure that has been read, so as to detect a leaf node with which a ray intersects. In addition, the TRV unit 342 repeats traversal of the acceleration structure until a leaf node with which a ray intersects is detected.

The TRV unit 342 may traverse the acceleration structure along any one path, and when no ray intersects with a leaf node on a traversed path, the TRV unit 342 traverses the acceleration structure along another path. For example, referring to FIG. 4, the TRV unit 342 starts traversal from the second node 352 or the third node 353 which are lower nodes of the first node 351. When traversal starts from the second node 352, the TRV unit 342 stores information about the third node 353 in a separate memory.

The TRV unit 342 determines whether a ray intersects with the second node 352, and when a ray intersects with the second node 352, the TRV unit 342 performs traversal on one of the fourth node 354 and the fifth node 355, which are lower nodes of the second node 352.

When traversal is performed to determine whether the fourth node 354 and a ray intersect each other, the TRV unit 342 stores information about the remaining node, that is, the fifth node 355, in the separate memory. When the fourth node 354 and a ray intersect each other, the TRV unit 342 performs traversal on one of the sixth node 356 and the seventh node 357, which are lower nodes of the fourth node 354.

When traversal is performed to determine whether the sixth node 356 and a ray intersect each other, the TRV unit 342 stores information about the remaining node, that is, the seventh node 357, in the separate memory. When the sixth node 356 and a ray intersect each other, the TRV unit 342 detects the sixth node 356 as a leaf node.

As described above, the TRV unit 342 may perform traversal along any one path and detect a leaf node. The TRV unit 342 stores information about the remaining node along other paths in the separate memory, and after completing traversal on the one path, the TRV unit 342 performs traversal again on the remaining node that has been most recently stored. For example, after the sixth node 356 is detected as a leaf node, traversal is performed again on the seventh node 357 that has been most recently stored.

Accordingly, after completing traversal on one path, the TRV unit 342 does not perform traversal along that path from the top node again, but performs traversal on a path that is most adjacent to the path for which the traversal is completed, thereby reducing an amount of calculation.

That is, the TRV unit 342 performs a ray-node intersection test with respect to nodes included in an acceleration structure to detect a leaf node intersecting with a ray. In addition, the TRV unit 342 transmits information about the detected leaf node to the IST unit 344.

The IST unit 344 receives information about a lead node intersecting with a ray, from the TRV unit 342. In addition, the IST unit 344 receives, via the exclusive internal bus 390, geometric data included in the information that is about objects and is stored in the memory 350. That is, the IST unit 344 reads geometric data by using the exclusive internal bus 390. The geometric data includes information about vertices and positions of primitives included in an object.

The IST unit 344 performs an intersection test between a ray and primitives by using geometric data. According to an embodiment, the IST unit 344 tests to determine which of a primitives included in the lead node of the received information a ray intersects. Thus, the IST unit 344 detects primitives with which a ray intersects, and calculates a hit point between the intersected primitives and the ray. Next, the IST unit 344 transmits information about the hit point to the shader 360 via the system bus 380.

Accordingly, regarding rendering by ray tracing, since the number of times of reading information about objects is relatively high in a process of performing an intersection test, the intersection tester 340 is embedded in the memory chip 330 and reads information that is about objects in the memory chip 330, and thus reduces memory traffic and power consumption caused when using the system bus 380.

The shader 360 receives information about a hit point from the IST unit 344 via the system bus 380, and determines a pixel value based on the information about the hit point and characteristics of a material of the hit point. Next, the shader 360 transmits the pixel value to the memory chip 330 via the system bus 380.

The frame buffer 370 embedded in the memory chip 330 stores the pixel value.

In addition, after performing shading on one pixel, the ray generator 320 generates a ray for other pixels in order to perform shading on the other pixels, and an intersection test and shading may be performed by using the intersection tester 340 and the shader 360.

Figure 5:
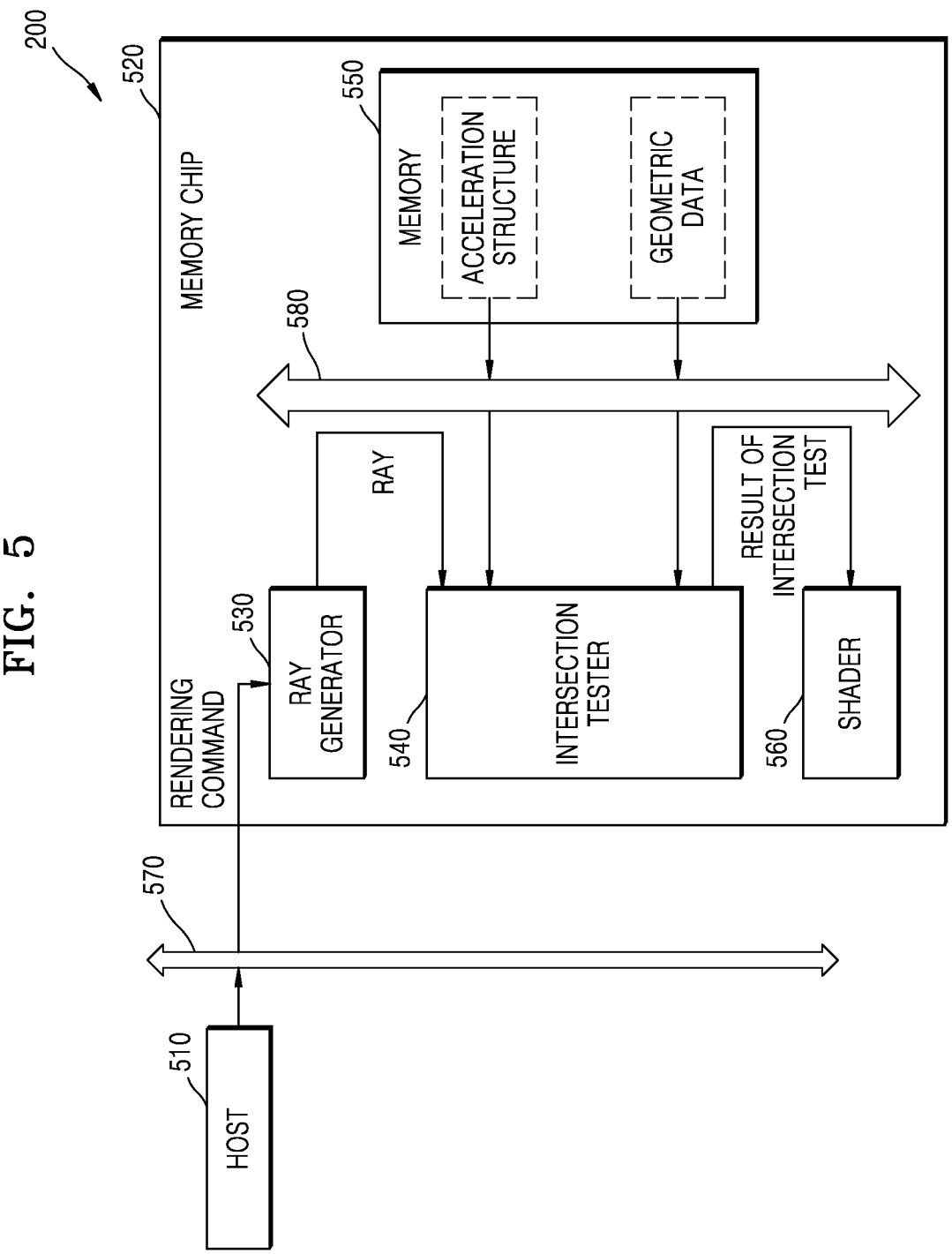
FIG. 5 illustrates a rendering system, according to another embodiment.

FIG. 5 illustrates the rendering system 200 according to another example.

The rendering system 200 includes a host 510, a memory chip 520, and a system bus 570. Also, the rendering system 200 includes a ray generator 530, an intersection tester 540, a shader 560, a memory 550, and an exclusive internal bus 580. In FIG. 5, only elements of the rendering system 200 related to the disclosed embodiment are illustrated. Thus, it will be obvious to one of ordinary skill in the art that general-purpose elements other than the elements illustrated in FIG. 5 may also be included.

The host 510, the memory chip 520, the system bus 570, the ray generator 530, the intersection tester 540, the shader 560, the memory 550, and the exclusive internal bus 580 of FIG. 5 respectively correspond to the ray generator 210 or 320, the intersection tester 222 or 340, the shader 230 or 360, the system bus 380, the memory 224 or 350, and the exclusive internal bus 390, and thus a repeated description of these elements will be omitted.

The host 510 transmits a rendering command to the memory chip 520 via the system bus 570.

The ray generator 530, the intersection tester 540, the shader 560, and the memory 550 are embedded in the memory chip 520. That is, the ray generator 530, the intersection tester 540, the shader 560, and the memory 550 are integrated in the memory chip 520.

The ray generator 530 receives a rendering command via the system bus 570, and generates a ray for ray tracing according to the rendering command. Also, the ray generator 530 transmits information about the generated ray to the intersection tester 540 via the exclusive internal bus 580.

The intersection tester 540 performs an intersection test between a ray and objects by using the information about rays received via the exclusive internal bus 580, an acceleration structure read via the exclusive internal bus 580, and geometric data. The intersection tester 540 calculates a hit point between a ray and a primitive based on a result of the intersection test, and transmits the calculated hit point to the shader 560 via the exclusive internal bus 580.

The shader 560 may performs pixel shading based on the result of the intersection test received via the exclusive internal bus 580.

Thus, according to the example of FIG. 5, a ray generator transmits information about a ray to an intersection tester in a memory chip, and because the intersection tester is able to transmit a result of the intersection test in the memory chip, memory traffic and power consumption caused when using a system bus are reduced.

Figure 6:
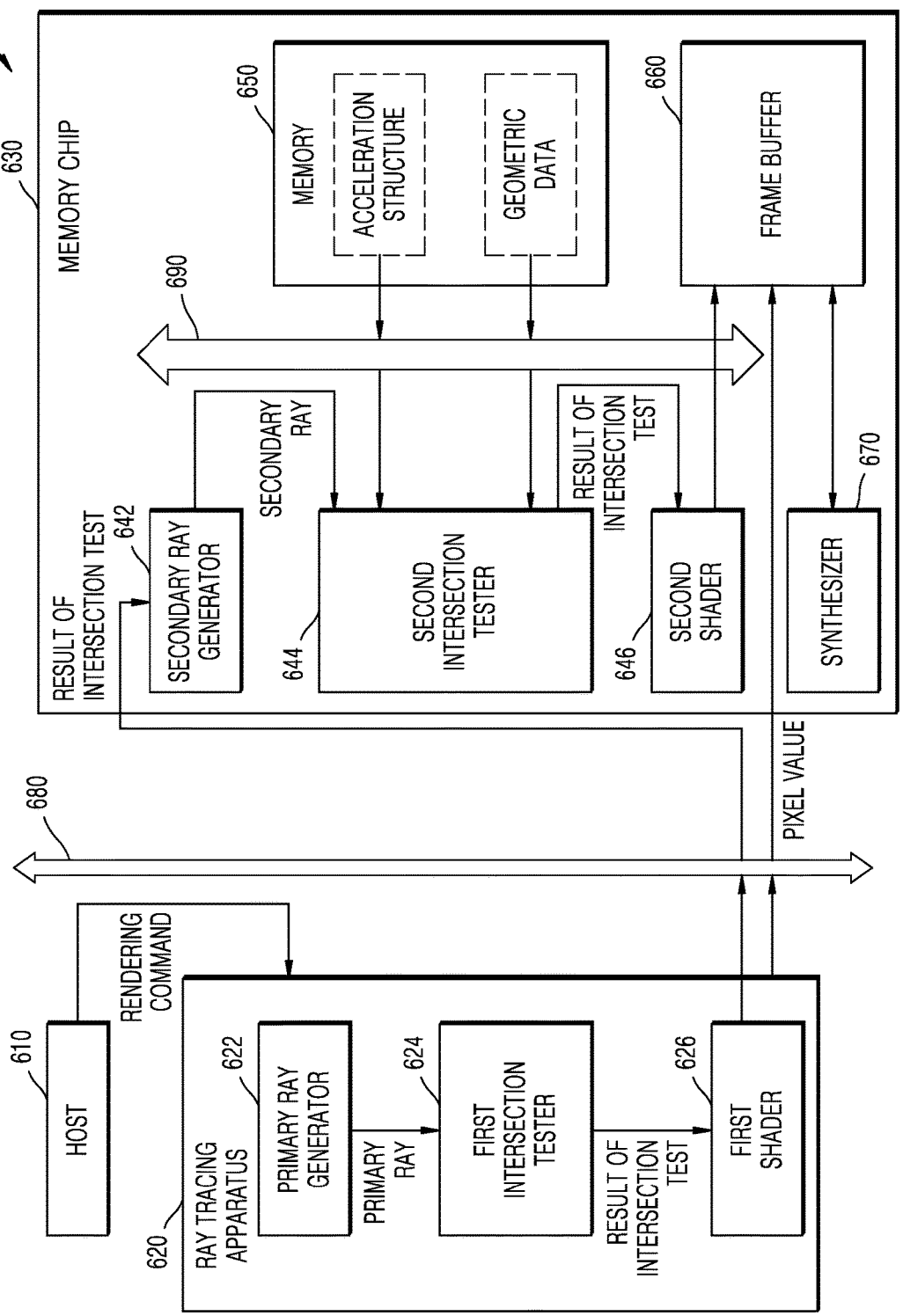
FIG. 6 illustrates a rendering system, according to another embodiment.

FIG. 6 illustrates the rendering system 300 according to another example.

The rendering system 300 includes a host 610, a ray tracing apparatus 620, a memory chip 630, and a system bus 680. The ray tracing apparatus 620 includes a primary ray generator 622, a first intersection tester 624, and a first shader 626. The memory chip 630 includes a secondary ray generator 642, a second intersection tester 644, a second shader 646, a memory 650, a frame buffer 660, an exclusive internal bus 690, and a synthesizer 670. In FIG. 6, only elements of the rendering system 300 related to the disclosed embodiment are illustrated. Thus, it will be obvious to one of ordinary skill in the art that general-purpose elements other than elements illustrated in FIG. 6 may also be included.

The host 610, the primary ray generator 622, the secondary ray generator 642, the first intersection tester 624, the second intersection tester 644, the first shader 626, the second shader 646, the memory 650, the system bus 680, the exclusive internal bus 690, and the frame buffer 660 of FIG. 6 respectively correspond to the ray generator 210, 320 or 530, the intersection tester 222, 340 or 540, the shader 230, 360 or 560, the system bus 380 or 570, the memory 224, 350 or 550, and the exclusive internal bus 390 or 580 of FIGS. 2, 3, and 5, and thus a repeated description of these elements will be omitted.

The host 610 transmits a rendering command to the ray tracing apparatus 620 via the system bus 680.

According to the rendering command, the ray tracing apparatus 620 generates a primary ray, performs an intersection test between the primary ray and objects, and determines a first pixel value based on a result of the intersection test.

In detail, the primary ray generator 622 generates a primary ray according to the rendering command received via the system bus 680. Next, the first intersection tester 624 reads an acceleration structure via the system bus 680 to perform an intersection test between the primary ray and a node. Also, the first intersection tester 624 may include a cache memory and may store a portion of an acceleration structure stored in the memory 650 in the cache memory. The first intersection tester 624 detects a leaf node intersecting with the primary ray via the intersection test between the primary ray and the node. Next, the first intersection tester 624 reads geometric data via the system bus 680 to calculate a hit point of a primitive intersecting with the primary ray. Next, the first shader 626 determines a first pixel value of a pixel based on information about the hit point and characteristics of a material of the hit point. Thus, the primary ray generator 622, the first intersection tester 624, and the first shader 626 sequentially generate primary rays with respect to other pixels, and perform an intersection test to determine first pixel values. The first shader 626 transmits the determined first pixel values to the memory chip 630 via the system bus 680, and the frame buffer 660 stores the first pixel values.

In addition, the ray tracing apparatus 620 transmits a result of the intersection test on the primary ray to the secondary ray generator 642. That is, the ray tracing apparatus 620 transmits a hit point of a primitive intersecting with the primary ray to the secondary ray generator 642 via the system bus 680.

The secondary ray generator 642 generates a secondary ray based on a result of the intersection test on the primary ray. That is, the secondary ray generator 642 generates a secondary ray such as a shadow ray, a reflection ray, or a refraction ray based on a hit point of a primitive intersecting with the primary ray. Also, the secondary ray generator 642 generates rays derived from the secondary ray. Next, the secondary ray generator 642 transmits information about the generated secondary ray to the second intersection tester 644 via the exclusive internal bus 690.

The second intersection tester 644 performs an intersection test between the secondary ray and objects by using information about the secondary ray that is received via the exclusive internal bus 690, an acceleration structure read via the exclusive internal bus 690, and geometric data. The second intersection tester 644 calculates a hit point between the secondary ray and the primitive as a result of the intersection test, and transmits information about the calculated hit point to the second shader 646 via the exclusive internal bus 690.

Next, the second shader 646 determines a second pixel value of a pixel based on the information about the hit point and characteristics of a material of the hit point. Then the second shader 646 transmits the determined second pixel value to the frame buffer 660 via the exclusive internal bus 690, and the frame buffer 660 stores the second pixel value.

The synthesizer 670 synthesizes the first pixel value and the second pixel value of a predetermined pixel stored in the frame buffer 660 to determine a final pixel value. That is, the synthesizer 670 synthesizes the first pixel value and the second pixel value to determine a final pixel value to which effects according to all of the primary ray and the secondary ray such as a refraction ray, a reflection ray or a shadow ray are reflected. In addition, the synthesizer 670 stores the final pixel value in the frame buffer 660.

Figure 7:
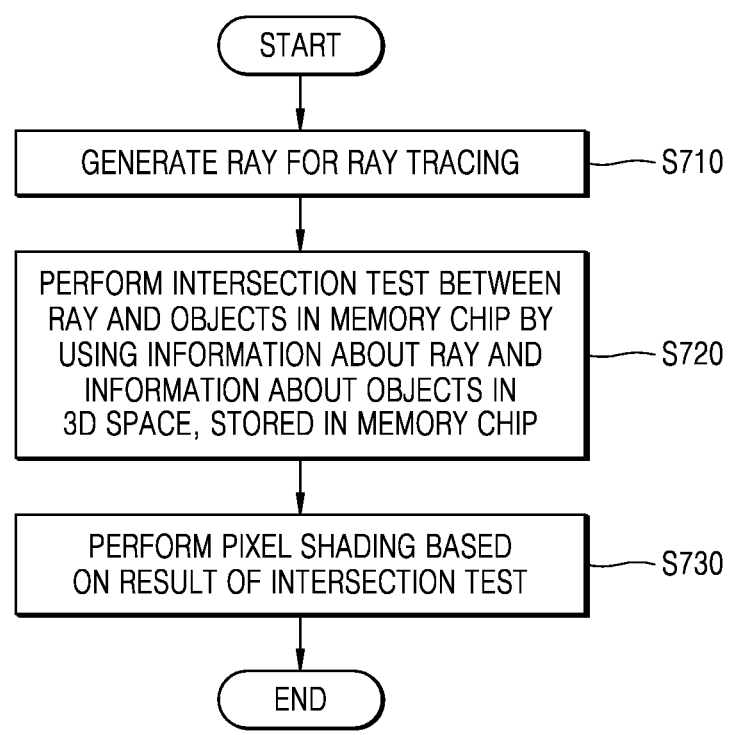
FIG. 7 is a flowchart of a rendering method performed by the rendering system of FIG. 2, 3, 5, or 6, according to an embodiment.

FIG. 7 is a flowchart of a rendering method performed by the rendering system 100, 100a, 200, or 300 according to an example.

In operation S710, the rendering system 100, 100a, 200, or 300 generates a ray for ray tracing. The ray includes a primary ray generated from a view point and rays derived from the primary ray. Also, the rendering system 100, 100a, 200, or 300 generates a ray for ray tracing according to a rendering command.

In operation S720, the rendering system 100, 100a, 200, or 300 performs an intersection test between the ray and objects in a memory chip 220, 330, 520 or 630 by using information about the generated ray and information about 3D spatial objects stored in the memory chip 220, 330, 520 or 630. The information about 3D spatial objects includes an acceleration structure including position information of the objects and geometric data including information about vertices and positions of primitives included in the objects. In detail, the rendering system 100, 100a, 200, or 300 reads an acceleration structure of the information about objects, via an exclusive internal bus 390, 580 or 690 embedded in the memory chip 220, 330, 520 or 630. Next, the rendering system 100, 100a, 200, or 300 performs a ray-node intersection test based on information about the ray and the acceleration structure. That is, the rendering system 100, 100a, 200, or 300 reads the acceleration structure stored in the memory chip 220, 330, 520 or 630 to perform a ray-node intersection test. Also, the rendering system 100, 100a, 200, or 300 reads geometric data of the information about objects via the exclusive internal bus 390, 580 or 690 embedded in the memory chip 220, 330, 520 or 630. Next, the rendering system 100, 100a, 200, or 300 calculates a hit point between the ray and a primitive based on the information about the ray and the geometric data. That is, the rendering system 100, 100a, 200, or 300 reads the geometric data stored in the memory chip 220, 330, 520 or 630 to calculate a hit point between the ray and the primitive. Accordingly, the rendering system 100, 100a, 200, or 300 calculates a hit point of the ray intersecting with a primitive included in an object as a result of the intersection test between the ray and the objects.

According to an embodiment, in operation S730, the rendering system 100, 100a, 200, or 300 performs pixel shading based on a result of the intersection test between the ray and the objects. That is, the rendering system 100, 100a, 200, or 300 determines a pixel value based on the information about the hit point between the ray and the primitive and characteristics of a material of the hit point. The pixel value may include a color value of a pixel.

According to another embodiment, the rendering system 100, 100a, 200, or 300 generates a ray for ray tracing in the memory chip 220, 330, 520 or 630. Also, the rendering system 100, 100a, 200, or 300 performs pixel shading in the memory chip 220, 330, 520 or 630 based on a result of an intersection test between a ray and objects.

According to another embodiment, the rendering system 300 generates a primary ray, performs an intersection test between the primary ray and objects, and determines a first pixel value based on a result of the intersection test. Next, the rendering system 300 generates a secondary ray based on the result of the intersection test on the primary ray. That is, the rendering system 300 generates a secondary ray such as a shadow ray, a reflection ray or a refraction ray based on a hit point of a primitive intersecting with the primary ray. In addition, the rendering system 300 generates rays derived from the secondary ray. Next, the rendering system 300 performs an intersection test between the secondary ray and objects in the memory chip 630. That is, the rendering system 300 calculates a hit point between the secondary ray and the primitive based on a result of the intersection test. Next, the rendering system 300 determines a second pixel value based on a result of the intersection test between the secondary ray and objects. Next, the rendering system 300 synthesizes the first pixel value and the second pixel value to determine a final pixel value. That is, the rendering system 300 synthesizes the first pixel value and the second pixel value to determine a final pixel value to which effects according to the primary ray and the secondary ray such as a refraction ray, a reflection ray, or a shadow ray are reflected.

Figure 8:
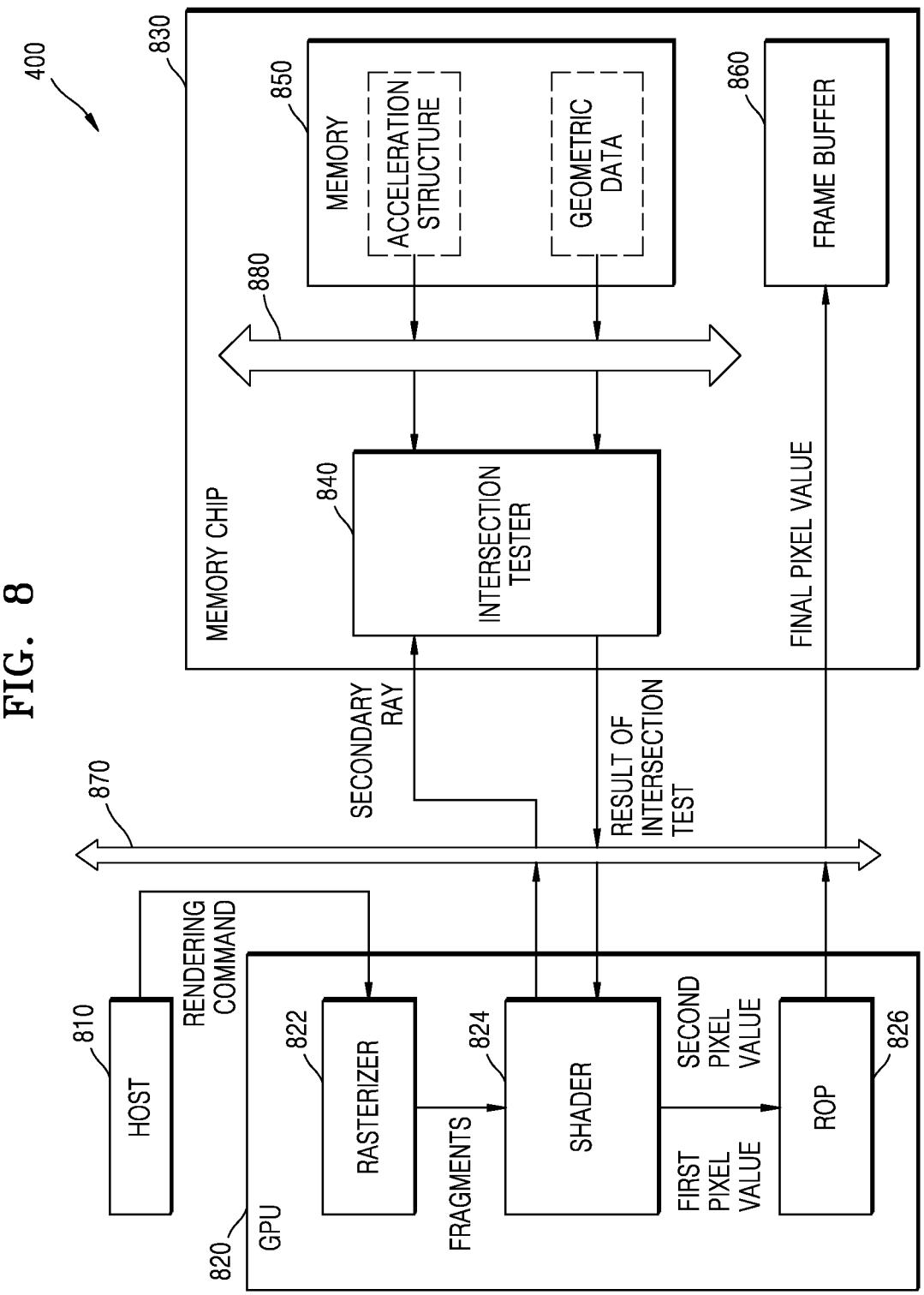
FIG. 8 illustrates a rendering system, according to another embodiment.

FIG. 8 illustrates the rendering system 400 according to another example.

The rendering system 400 includes a host 810, a graphic processor unit (GPU) 820, a memory chip 830, and a system bus 870. Also, the memory chip 830 includes an intersection tester 840, a memory 850, a frame buffer 860, and an exclusive internal bus 880. In FIG. 8, only elements of the rendering system 400 related to the disclosed embodiment are illustrated. Thus, it will be obvious to one of ordinary skill in the art that general-purpose elements than other than the elements illustrated in FIG. 8 may also be included.

The host 810, the intersection tester 840, the memory 850, the frame buffer 860, and the exclusive internal bus 880 of FIG. 8 respectively correspond to the ray generator 210 or 320, the intersection tester 222 or 340, the shader 230 or 360, the system bus 380, the memory 224 or 350, and the exclusive internal bus 390 of FIGS. 2 and 3, and thus a repeated description of these elements will be omitted.

The host 810 transmits a rendering command to the GPU 820 via the system bus 870.

The GPU 820 includes a rasterizer 822, a shader 824, and a raster operator (ROP) 826. The GPU 820 is a processor exclusively used for processing graphics and includes hardware configured to render 3D objects on a 3D image to a 2D image for displays. For example, the GPU 820 performs various functions such as shading, blending or illuminating or various functions to generate pixel values of pixels to be displayed.

The GPU 820 determines a first pixel value of a pixel by performing rendering via rasterization according to the rendering command received via the system bus 870.

In detail, the rasterizer 822 splits a primitive included in a frame into fragments. A fragment is a unit constituting a primitive, and may be a basic unit for performing image processing. A primitive includes only information about a vertex. Thus, the rasterizer 822 performs interpolation when generating fragments between vertices when splitting a primitive.

Next, the shader 824 performs shading on a fragment to determine a first pixel value of a pixel. That is, the shader 824 performs shading on a fragment in units of fragments to determine a first pixel value of pixels constituting a frame. For example, the shader 824 may appoint a color of a fragment to determine a color value of a pixel. The shader 824 transmits the first pixel value to the ROP unit 826.

The shader 824 generates a ray for ray tracing. In detail, the shader 824 calculates a hit point between a primary ray and objects based on geometric data, and generates a secondary ray such as a reflection ray, a refraction ray or a shadow ray based on the hit point. In particular, the shader 824 uses at least one of depth information, a normal vector, and position information of a primitive among the geometric data. Thus, the shader 824 generates the ray for ray tracing as a secondary ray.

Next, the shader 824 transmits information about the generated secondary ray to the memory chip 830 via the system bus 870.

The intersection tester 840 performs an intersection test between the secondary ray and objects by using the information about the secondary ray received via the system bus 870, an acceleration structure read via the exclusive internal bus 880, and geometric data. The intersection tester 840 calculates a hit point between the secondary ray and a primitive based on a result of the intersection test, and transmits information about the calculated hit point to the shader 824 via the system bus 870.

The shader 824 determines a second pixel value of a pixel based on information about the hit point transmitted via the system bus 870 and characteristics of a material of the hit point. The shader 824 transmits the second pixel value to the ROP 826.

The ROP 826 synthesizes the first pixel value and the second pixel value received from the shader 824 to determine a final pixel value. According to an embodiment, the first pixel value generated as a result of rendering via rasterization corresponds to a pixel value generated as a result of ray tracing on a primary ray, and thus, the final pixel value obtained by synthesizing the first pixel value and the second pixel value is a final pixel value, to which effects according to the primary ray and the secondary ray such as a refraction ray, a reflection ray or a shadow ray are reflected.

Next, the ROP 826 transmits the final pixel value to the memory chip 830 via the system bus 870, and the frame buffer 860 in the memory chip 830 stores the final pixel value.

Figure 9:
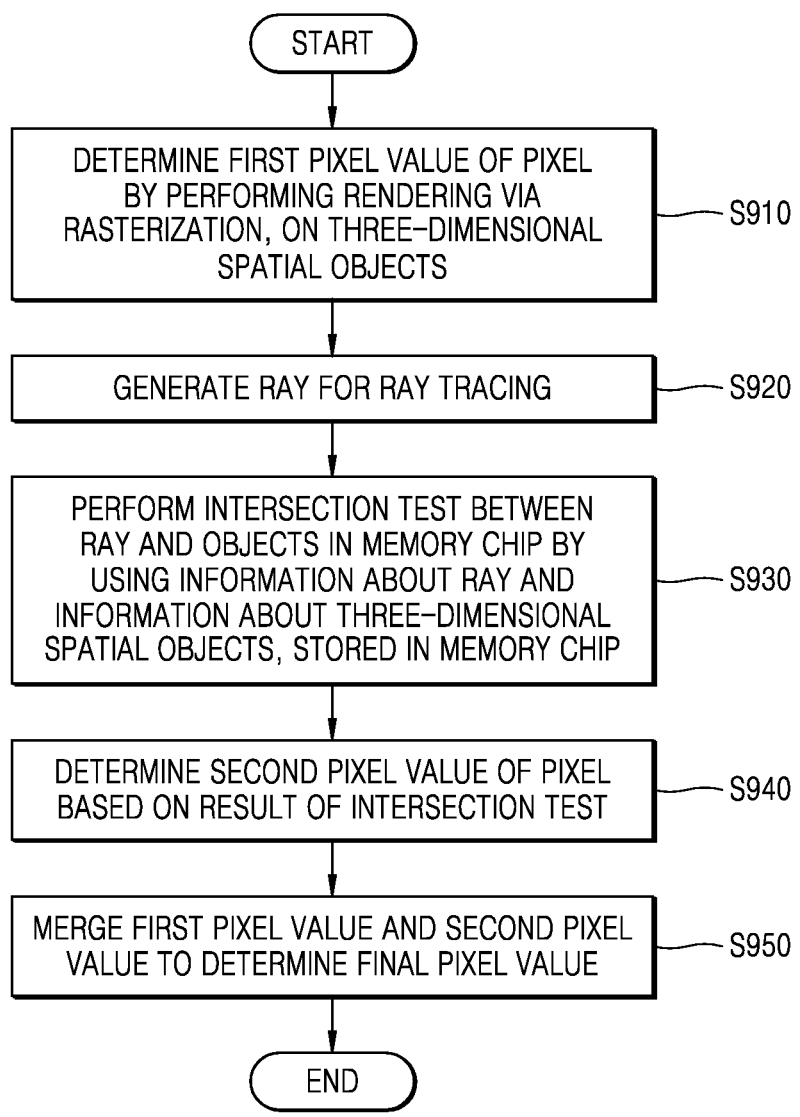
FIG. 9 is a flowchart of a rendering method performed by the rendering system of FIG. 8, according to another embodiment.

FIG. 9 is a flowchart of a rendering method performed by the rendering system 400 according to another example.

In operation S910, the rendering system 400 performs rendering via rasterization to determine a first pixel value of a pixel. In detail, the rendering system 400 splits a primitive included in a frame into fragments. Next, the rendering system 400 performs shading on a fragment to determine a first pixel value of a pixel. That is, the rendering system 400 performs shading on a fragment in units of fragments to determine a first pixel value of pixels constituting a frame.

In operation S920, the rendering system 400 generates a ray for ray tracing. In detail, the rendering system 400 calculates a hit point between a primary ray and objects based on geometric data, and generates a secondary ray such as a reflection ray, a refraction ray or a shadow ray based on the hit point.

In operation S930, the rendering system 400 performs an intersection test between the secondary ray and objects by using information about the secondary ray and information about objects, read via the exclusive internal bus 880 embedded in the memory chip. The rendering system 400 calculates a hit point between the secondary ray and a primitive based on a result of the intersection test.

In operation S940, the rendering system 400 determines a second pixel value of the pixel based on the information about the hit point between the secondary ray and the primitive and characteristics of a material of the hit point.

In operation S950, the rendering system 400 synthesizes the first pixel value and the second pixel value to determine a final pixel value. According to an embodiment, the first pixel value generated as a result of rendering via rasterization corresponds to a pixel value generated as a result of ray tracing on the primary ray, and thus, the final pixel value obtained by synthesizing the first pixel value and the second pixel value is a final pixel value, to which effects according to the primary ray and the secondary ray such as a refraction ray, a reflection ray or a shadow ray are reflected. Next, the rendering system 400 transmits the final pixel value in the frame buffer.

According to the disclosed embodiments, since the number of times of reading information about objects is relatively high when performing an intersection test between a ray and objects, and since an intersection test is performed in a memory chip, memory traffic and power consumption caused when using a system bus are reduced.

The apparatuses, units, modules, devices, and other components (e.g., the ray generators 210/320/530/622/642, shaders 230/360/560/626/646/824, memory chips 220/330/520/630/830, intersection testers 222/340/540/624/644/840, memory 224/350/550/650/850, host 310/510/610/810, TRV unit 342, IST unit 344, frame buffers 370/660/860, synthesizer 670, GPU 820, rasterizer 822 and ROP 826) illustrated in FIGS. 2, 3, 5, 6 and 8 that perform the operations described herein with respect to FIGS. 7 and 9 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 7 and 9. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 7 and 9 that perform the operations described herein with respect to FIGS. 2, 3, 5, 6 and 8 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

For the sake of brevity, conventional electronics, control systems, software development and other functional aspects of the systems may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device.

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or example language (e.g., "such as") provided herein, is intended merely to better illuminate the inventive concept and does not pose a limitation on the scope of the inventive concept unless otherwise claimed.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rendering system comprising:
a ray generator circuit configured to generate a ray;
a memory chip configured to store information about objects in three-dimensional (3D) space;
an intersection tester embedded in the memory chip and configured to perform an intersection test between the ray and the objects by using the information about the objects and information about the ray via an exclusive internal bus embedded in the memory chip; and
a shader circuit configured to perform pixel shading based on a result of the intersection test.

2. The rendering system of claim 1, wherein the intersection tester is configured to perform the intersection test in the memory chip.

3. The rendering system of claim 1, further comprising a memory configured to store the information about the objects, wherein the memory and the intersection tester are integrated in the memory chip and communicate via the exclusive internal bus.

4. The rendering system of claim 1, wherein:
the intersection tester is configured to receive information about the ray via a system bus;
the intersection tester is configured to receive the information about the objects via the exclusive internal bus embedded in the memory chip; and
the shader circuit is configured to receive a result of the intersection test via the system bus.

5. The rendering system of claim 4, wherein the exclusive internal bus comprises a memory bandwidth that is broader than a memory bandwidth of the system bus.

6. The rendering system of claim 1, wherein the intersection tester comprises:
a traversal (TRV) unit configured to traverse an acceleration structure which is included in the information about the objects to perform an intersection test between the ray and a node; and
an intersection (IST) unit configured to calculate a hit point of the ray intersecting with a primitive based on a result of the intersection test between the ray and the node and by using geometric data included in the information about the objects,
wherein the shader circuit is configured to determine a pixel value based on the hit point.

7. The rendering system of claim 1, wherein the ray generator circuit and the shader circuit are embedded in the memory chip.

8. The rendering system of claim 7, wherein:
an intersection (IST) unit configured to receive the information about the ray and the information about the objects via the exclusive internal bus embedded in the memory chip,
the shader circuit is configured to receive a result of the intersection test via the exclusive internal bus.

9. The rendering system of claim 7, further comprising a ray tracing circuit configured to generate a primary ray, perform an intersection test between the primary ray and the objects, and determine a first pixel value based on a result of the intersection test between the primary ray and the objects,
wherein the ray generator is configured to generate a secondary ray based on the result of the intersection test between the primary ray and the objects,
wherein the intersection tester is configured to perform an intersection test between the secondary ray and the objects, and
wherein the shader circuit is configured to determine a second pixel value based on a result of the intersection test between the secondary ray and the objects.

10. The rendering system of claim 9, wherein the memory chip includes a synthesizer configured to merge the first pixel value and the second pixel value to determine a final pixel value.

11. A rendering system, comprising:
a memory chip configured to store information about objects in three-dimensional (3D) space;
a graphics processing unit (GPU) configured to determine a first pixel value of a pixel by performing rendering via rasterization on the objects, and generate a ray; and
an intersection tester embedded in the memory chip and configured to perform an intersection test between the ray and the objects by using information stored in the memory chip via an exclusive internal bus embedded in the memory chip about the ray and information about the objects,
wherein the GPU is configured to determine a second pixel value of the pixel based on a result of the intersection test and merge the first pixel value and the second pixel value to determine a final pixel value.

12. The rendering system of claim 11, wherein the intersection tester is configured to perform the intersection test in the memory chip.

13. The rendering system of claim 11, wherein:
the intersection tester is configured to receive the information about the ray via a system bus;
the intersection tester is configured to receive the information about the objects via an exclusive internal bus embedded in the memory chip; and
the GPU is configured to receive a result of the intersection test via the system bus.

14. The rendering system of claim 11, wherein the GPU comprises:
a rasterizer configured to split primitives of the objects into fragments;
a shader configured to perform shading on the fragments to determine the first pixel value and to determine the second pixel value based on a result of the intersection test; and
a raster operator (ROP) configured to merge the first pixel value and the second pixel value to determine the final pixel value.

15. The rendering system of claim 14, wherein the shader is configured to calculate a hit point between a primary ray and the objects, and generate the ray based on the hit point as a secondary ray.

16. A rendering method comprising:
generating a ray;
performing, in a memory chip, an intersection test between the ray and objects in three-dimensional (3D) space by an intersection tester embedded in the memory chip by using information about the ray and information about 3D spatial objects stored in the memory chip via an exclusive internal bus embedded in the memory chip; and
performing pixel shading based on a result of the intersection test.

17. The rendering method of claim 16, wherein the performing of the intersection test comprises reading the information about the objects via the exclusive internal bus embedded in the memory chip.

18. The rendering method of claim 16, wherein:
the generating of the ray comprises generating the ray in the memory chip; and
the performing of the pixel shading comprises performing the pixel shading in the memory chip.

19. The rendering method of claim 16, further comprising generating a primary ray, performing an intersection test between the primary ray and the objects, and determining a first pixel value based on a result of the intersection test between the primary ray and the objects,
wherein the generating of the ray comprises generating a secondary ray based on the result of the intersection test between the primary ray and the objects,
wherein the performing of the intersection test comprises performing an intersection test between the secondary ray and the objects, and
wherein the performing of the pixel shading comprises determining a second pixel value based on a result of the intersection test between the secondary ray and the objects.

20. The rendering method of claim 19, further comprising merging the first pixel value and the second pixel value to determine a final pixel value.

21. A memory chip, comprising:
a memory configured to store information about objects in three-dimensional (3D) space; and
an intersection tester configured to
receive information about a ray,
perform an intersection test between the ray and the objects by using the information about the objects and the information about the ray stored in the memory and provided to the intersection tester embedded in the memory chip via an exclusive internal bus, and
provide results of the intersection test to a shader of the memory chip for performing pixel shading.

22. The memory chip of claim 21, further comprising an exclusive internal bus embedded in the memory chip, wherein the intersection tester is configured to receive the information about the objects from the memory via the exclusive internal bus.

23. The memory chip of claim 21, the intersection tester is configured to:
traverse an acceleration structure which is included in the information about the objects to perform an intersection test between the ray and a node; and
calculate, for the pixel shading, a hit point of the ray intersecting with a primitive based on a result of the intersection test between the ray and the node and by using geometric data included in the information about the objects.

24. The memory chip of claim 21, further comprising a ray generator circuit that generates the ray for the intersection test, and wherein the ray generator circuit and the shader are embedded in the memory chip.

* * * * *